Figure 1:
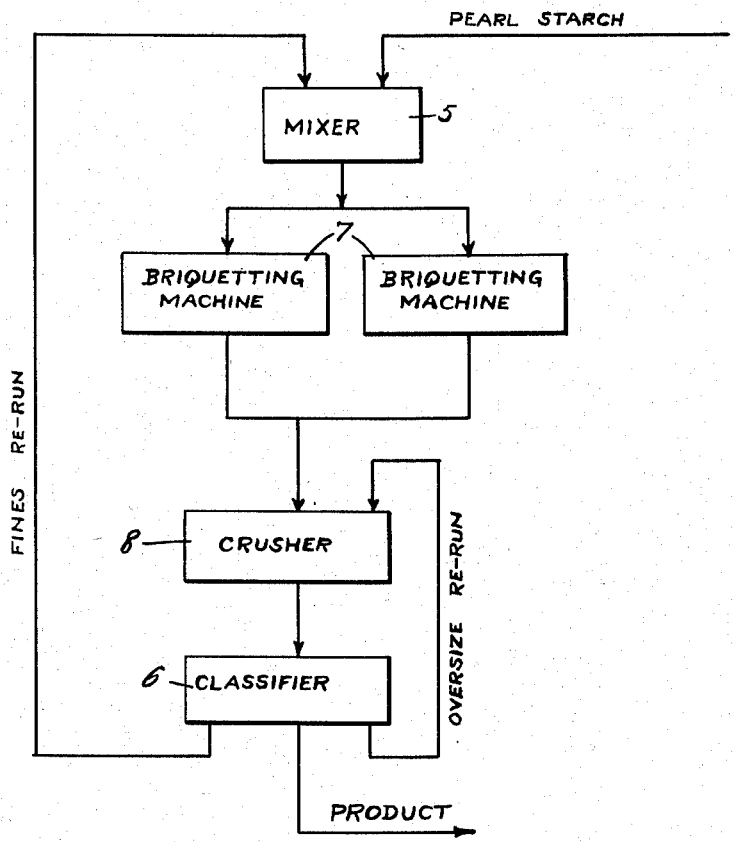

United States Patent Office 2,907,685
Patented Oct. 6, 1959

2,907,685

COMPRESSED STARCH GRITS

Clifford E. Smith, Decatur, Ill., assignor to A. E. Staley Manufacturing Company, Decatur, Ill., a corporation of Delaware Application May 24, 1956, Serial No. 587,002

4 Claims. (Cl. 127—71)

This invention relates to a dry compressing or briquetting process for manufacturing starch grits and to the unique binder-free, cold water suspendable starch grits and briquettes produced thereby.

Large quantities of starch in the form of grits or granular lumps are consumed annually, primarily for industrial purposes. Starch in this form is commonly referred to as "starch grits." Patent 2,098,293 to Jefferies, dated November 9, 1937, and Patent 2,168,524 to Horesi, dated August 8, 1939, describe starch grits and dry methods of producing the same. The Horesi patent is in the nature of an improvement on the Jefferies patent and points out that the starch grits of Jefferies consist of substantially pure starch, most of which is in a raw state, that is, with the starch granules intact, and not destroyed or appreciably affected by the treatment, although possibly somewhat swollen, with a small portion gelatinized, that is, having the starch cells disrupted and dispersed. Horesi and Jefferies point out that the gelatinized starch serves to cement or bind the raw starch particles together. Both patents bring out that the final product, i.e. starch grits, is dry and dustless and that the gelatinized portion should be kept to a minimum. Heretofore, starch grits have been prepared by a wet process wherein an aqueous slurry of starch, or a portion thereof, is heated so as to develop binding properties therein, and then the entire starch slurry is dewatered. Usually, the slurry is dewatered on a vacuum filter. The filter cake is normally dried to a moisture content of about 6–8% and then it is ground and screened. Patent No. 2,178,235, dated October 31, 1939, contains a description of one particular wet process for producing starch grits by the foregoing general method.

The wet process of manufacturing starch grits, which heretofore has been the only commercial one, is undesirable for several reasons. One of the most difficult and objectionable features of the wet process is the difficulty of controlling the partial gelatinization of the unmodified starch in order to obtain the necessary degree of binding action. The process is very sensitive from this standpoint and the resulting starch grits will be unsatisfactory if there is either over-gelatinization or under-gelatinization. Furthermore, the degree of gelatinization may adversely affect the filtering or dewatering rate and thereby greatly increase the production costs. Even at best the filtering or dewatering step is slow, messy, and entails the use of expensive equipment which is costly to operate.

Not only is the wet process of preparing starch grits an objectionable one for the foregoing reasons, but, in addition, the resulting starch grits tend to be non-uniform in respect to hardness and abrasion resistance and they do not disperse in cold water to form a slurry composed of suspended natural granules, as it is desirable for a dry starch product to do.

In accordance with the present invention it has been unexpectedly found that starch grits having unique and greatly improved characteristics (i.e. cold water suspendability, high uniformity of product, greater bulk density, and readily converted by enzymes) may be produced by a novel dry process. The starch grits of my invention are superficially dried and substantially ungelatinized starch granules loosely bound together in the form of pellets or coarse particles due to briquetting under controlled moisture and pressure, with the component granules having substantially the same physical and pasting properties as they had prior to being formed into grits. While this novel process can be very economically carried out on a continuous basis with the use of inexpensive automatic equipment so as to produce a very uniform product, there are certain critical features of the process which have to be observed for successful production. However, these critical features are easily attained and the process is not difficult to control when carried out commercially.

Briefly stated, the present invention involves subjecting starch having a moisture content of 9–18% to a momentary pressure within the range of 5,000 to 50,000 pounds per square inch. Starch as it comes from the Proctor & Schwartz driers in the wet mill process is crushed, but not ground or bolted, to the so-called pearl form. When such starch is unmodified, it is referred to in the art as pearl starch (Chemistry and Industry of Starch—Kerr second edition, page 59). Modified starches in the pearl form may also be used. Also, starch in the powdered form may be used but not as desirably. Whether the starch grits are formed from native starches (e.g. pearl starch) or from a modified starch in pearl form, the starch in all cases will be in the form of granules, i.e. ungelatinized. Furthermore, in the grit-forming process of this invention the granules are not appreciably physically modified in the process.

Broadly stated, the object of the invention is an economical, easily controlled, dry process for producing with a high degree of uniformity starch grits which are readily suspendable in cold water.

An important object of the invention is a novel type of starch grits or briquettes characterized by their high degree of uniformity, readiness with which they may be completely suspended in cold water, increased bulk density, and rapidity with which they are attacked by starch converting enzymes.

An important object of the invention is a dry process of producing starch grits from pearl starch or the equivalent without the use of a binder which are at least as dust-free as conventional wet-processed starch grits and which are cold water suspendable.

An important object of the invention is a continuous dry process of producing starch grits from pearl starch or the equivalent wherein the fines and oversize product may be re-run so that there is substantially no loss of starch in the process.

Certain other objects of the invention will, in part, be obvious and will, in part, appear hereinafter.

Figure 2:
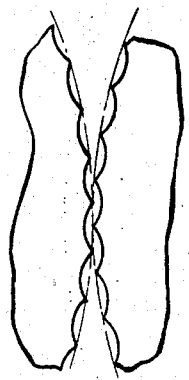

For a more complete understanding of the nature and scope of the invention, reference may now be had to the following detailed description thereof taken in connection with the accompanying drawing wherein:

Figure 1 is a flow diagram of one continuous process by which the invention may be practiced; and Figure 2 is a view illustrating a preferred setting of the briquetting rolls.

Referring now to the drawing, unmodified pearl starch, preferably fairly coarse, having a moisture content of 9–18% and preferably 11–16% is introduced into a continuous dry mixer 5 of known commercial type along with re-run fines which are returned from a classifier or screening station indicated at 6. In a typical operation the pearl starch is continuously introduced into the mixer 5 at the rate, on the basis of weight, of about 3 times that at which the fines are introduced into the mixer.

An optimum product is obtained when the pearl starch has a moisture content of 13–15%. If the moisture content is too low, for example, below 9%, the product is too soft and if the moisture content is too high, for example, above 18%, the product is too hard and starts to develop a resistance to cold water suspendability.

The blended mixture of pearl starch and re-run fines discharged from the mixer 5 is distributed to briquetting machines designated at 7—7. These briquetting machines may be of known type (e.g. a Komarek-Greaves briquetting machine) which are fed automatically and which operate to continuously discharge a strip of compressed material. One type of briquetting machine which has been used satisfactorily has compression rolls which were longitudinally fluted and which were so driven as to continuously form a compressed strip of briquettes.

Preferably the rolls are set so that the flutes and fillets are out of register as illustrated in Figure 2. This arrangement avoids the over-compression that occurs between the fillets if they are in register. It was found that over-compression caused gelatinization at the edges.

While any suitable type of briquetting or compressing machine may be used, it is important that the compressed product have a uniform density throughout. If the product is under-compressed either over-all or in any area, it will not have the adequate abrasion resistance commercially required for starch grits. On the other hand, if the product is over-compressed either over-all or in any area, a change occurs in the starch which is probably in the nature of partial gelatinization due to high compression, and the resulting product will not be cold water suspendable.

The briquettes continuously discharged from the briquetting machines 7 are introduced into a continuous crusher of known type indicated at 8. For example, crushing rolls may be used for this operation. These crushing rolls are set to operate with maximum efficiency in producing a product having the desired grit size, for example, grits which will pass through a No. 4 Standard sieve and will be retained on a No. 8 Standard sieve (i.e. 4 x 8 mesh grits). In a typical operation of the process described, the product from the crusher 8 prior to classification contained about 20–25% fines and about 10–12% oversize, with the balance being acceptable product of the desired particle size.

The entire crushed product is delivered into a classifier 6 of known commercial type wherein the fines are separated and returned to the mixer 5 as described above and the oversize product is separated and returned to the crusher as indicated. The acceptable product is discharged for packaging or further handling.

The outstanding difference between the new starch grits produced in accordance with the dry process of the present invention and ordinary starch grits produced by conventional wet processes is the fact that the new starch grits are readily (even instantly) cold water suspendable whereas the starch grits produced by conventional processes are not. The test used for determining cold water suspendability was made in the following manner:

One hundred grams of 4 x 8 mesh grits are introduced into 800 grams of tap water at 85° F. The mixture is stirred with a motor stirrer for 5 minutes at a speed just fast enough to keep the grits in motion. At the end of 5 minutes the mixture was poured through a 60 mesh Tyler screen and the residue, if any, remaining on the screen was dried and weighed.

When numerous samples of starch grits manufactured in accordance with the present invention were subjected to this test for cold water suspendability, they were found to be cold water suspendable to the extent of at least 99.5% by weight. In other words, not more than 0.5% by weight of the grits was non-suspendable. Usually, the starch grits were 100% or completely water suspendable in less than a minute. On the other hand, ordinary starch grits produced by conventional wet processing are not more than 25% suspendable when measured by the foregoing test.

Another advantage of the new starch grits produced by this invention over conventional starch grits is the fact that the new starch grits produced have an increased bulk density. For example, starch grits of 4 x 8 mesh produced by the present invention will have a bulk density of approximately 40–45 pounds per cubic foot whereas conventional starch grits of the same mesh size will have a bulk density of about 28–35 pounds per cubic foot. This substantial increase in bulk density is important economically since it means a reduction in cost for containers and less space is required for both storage and transportation.

Having fully disclosed the invention and described the presently preferred manner of practicing the same, what is claimed as new is:

1. The method of producing binder-free cold water suspendable starch briquettes and grits which comprises briquetting starch granules having a moisture content of about 9–18% at a pressure of 5,000 to 50,000 pounds per square inch, whereby said starch granules are not appreciably physically modified.

2. The method of producing binder-free cold water suspendable starch briquettes and grits which comprises briquetting starch granules, having a moisture content of about 11–16% at a pressure of 5,000 to 50,000 pounds per square inch, whereby said starch granules are not appreciably physically modified.

3. The method of producing binder-free cold water suspendable starch grits which comprises compressing starch granules having a moisture content of about 9–18% momentarily to a pressure of about 5,000 to 50,000 pounds per square inch between fluted briquetting rolls in which the flutes and fillets are out of register at least a substantial degree, whereby said starch granules are not appreciably physically modified.

4. The cyclic continuous process of producing binder-free, cold water suspendable starch grits which comprises mixing pearl starch having a moisture content of about 9–18% with fines produced in the process, continuously briquetting the mixture of pearl starch and fines to a bulk density of about 40–45 pounds per cubic foot, crushing the resulting briquettes, classifying the crushed material into product-size grits, fines and oversize pieces, returning the fines to said mixing step, and returning the oversize pieces to said crushing step, the starch granules comprising said pearl starch not being appreciably physically modified in said process.

References Cited in the file of this patent

UNITED STATES PATENTS

| 541,941 | Moffatt | July 2, 1895 |
| 545,128 | Moffatt | Aug. 27, 1895 |
| 1,035,829 | Anderson | Aug. 20, 1912 |
| 2,098,293 | Jefferies | Nov. 9, 1937 |
| 2,168,524 | Horesi | Aug. 8, 1939 |
| 2,178,235 | Lauterback | Oct. 31, 1939 |
| 2,214,018 | Gill | Sept. 10, 1940 |
| 2,464,081 | Hansen | Mar. 8, 1949 |

OTHER REFERENCES

"Starch and its Derivatives," by Radley, D. Van Nostrand Co. Inc., New York, 1944, pp. 76, 254 and 309.